United States Patent
Tatsumura

(10) Patent No.: US 6,869,225 B2
(45) Date of Patent: Mar. 22, 2005

(54) CENTER BEARING SUPPORT

(75) Inventor: Tsuyoshi Tatsumura, Fujisawa (JP)

(73) Assignee: NOK-Vibracoustic Co., LTD, Tokyo (JP)

( * ) Notice: Subject to any disclaimer, the term of this patent is extended or adjusted under 35 U.S.C. 154(b) by 0 days.

(21) Appl. No.: 10/169,082

(22) PCT Filed: Mar. 23, 2001

(86) PCT No.: PCT/JP01/02336

§ 371 (c)(1),
(2), (4) Date: Jul. 8, 2002

(87) PCT Pub. No.: WO01/70535

PCT Pub. Date: Sep. 27, 2001

(65) Prior Publication Data

US 2003/0002760 A1 Jan. 2, 2003

(30) Foreign Application Priority Data

Mar. 24, 2000 (JP) .......................... 2000-083629

(51) Int. Cl.[7] .............................. F16C 21/04
(52) U.S. Cl. ....................................... 384/536
(58) Field of Search ................ 384/536, 535, 384/582, 581, 544

(56) References Cited

U.S. PATENT DOCUMENTS 3,639,015 A * 2/1972 Maas ......................... 384/536

FOREIGN PATENT DOCUMENTS

JP 39-15305 8/1939
JP 2592242 1/1999

* cited by examiner

Primary Examiner—Lenard A. Footland
(74) Attorney, Agent, or Firm—Jacobson Holman PLLC

(57) ABSTRACT

A center bearing support having an increased shock absorbing capability by a stopper required when the vibrating displacement of a supported shaft is increased, including an inner ring installed on the inner periphery surface of an outer ring fixed to a body side through an elastic body made of elastomer material and a center bearing installed on the inner peripheral surface of the inner ring, wherein a stopper extending convergently is formed at the end part of the flexible main body of the elastic body, and a rib is formed between the stopper and the end part of the flexible main body at a specified phase interval, whereby, because a deformation force given by the contact of the stopper with the outer ring when an excessive displacement is input is absorbed by the displacement of the end part of the flexible main body, an abrupt rise of a spring constant can be suppressed.

1 Claim, 3 Drawing Sheets

US 6,869,225 B2

CENTER BEARING SUPPORT

This is a nationalization of PCT/JP01/02336 filed Mar. 23, 2001 and published in Japanese.

TECHNICAL FIELD

The present invention relates to a center bearing support which elastically supports a center bearing rotatably supporting a propeller shaft of a motor vehicle to the side of a vehicle body.

BACKGROUND ART

The center bearing support is structured such as to elastically support a center bearing (ball bearing) mounted to the outer periphery at a predetermined position in the axial direction of a propeller shaft (not shown) of a motor vehicle to the side of a vehicle body, thereby restricting a vibration of the propeller shaft during traveling, and reducing a vibration transmission between the side of the propeller shaft and the side of the vehicle body.

As shown in FIG. 5, conventionally, as this kind of center bearing support 100, there is a structure in which an outer ring 101 mounted to the side of a vehicle body and an inner ring 102 fitly attached to a center bearing 103 and arranged in the inner periphery thereof are elastically connected via an elastic body 104 formed of an elastomer material.

The elastic body 104 is structured such that a pair of flexible main bodies 104b and 104b formed in a J-like bent shape and being symmetrical with each other in the axial direction extend from both ends in the axial direction of a thick base portion 104a vulcanized and bonded to the inner ring 102, and outer peripheral end portions thereof are pressure inserted and fitted to the inner periphery of the outer ring 101 in a fixing manner. Further, a stopper 104c protruding out to the outer peripheral side between the flexible main bodies 104b and 104b so as to form a taper shape is formed in the base portion 104a. This stopper 104c is structured such as to be in contact with the outer ring 101 at a time when an amplitude of the propeller shaft is increased to be a fixed level or more, thereby to effect buffering.

However, in accordance with the conventional center bearing support, since the stopper 104c is formed in the outer periphery of the base portion 104a of the elastic body 104, as shown by a characteristic graph in FIG. 6, when a displacement of the propeller shaft is further increased after the stopper 104c is in contact with the inner peripheral surface of the outer ring 101 due to a displacement of the propeller shaft in the diametrical direction, a spring constant becomes suddenly high from a certain displacement amount (in this embodiment, near 8 mm), so that there is pointed out a problem that it is impossible to obtain a sufficient shock-absorbing property. This is because the stopper 104c generates a bending deformation at an initial time when it is in contact with the outer ring 101, thereby being soft, however, is exposed to a compression deformation between the outer ring 101 and the base portion 104a of the elastic body 104 at a time of completely falling down, thereby becoming hard.

The present invention is made by taking the problem mentioned above into consideration, and a main technical object thereof is to improve a shock-absorbing property applied by a stopper at a time when a vibration displacement of a supported shaft is increased.

DISCLOSURE OF THE INVENTION

As a means for effectively solving the technical object mentioned above, there is provided a center bearing support in which an inner ring is provided in the inner periphery of an outer ring fixed to the side of a vehicle body via an elastic body made of an elastomer material, and a center bearing rotatably supporting a supported shaft is mounted to the inner periphery of the inner ring, wherein a stopper is formed in one end portion of a flexible main body in the elastic body, the stopper being capable of bending to deform due to contact with the side of another end portion. That is, the stopper is formed in the end portion of the flexible main body, whereby a part of deformation force generated by the stopper contact is absorbed, and it is possible to restrict sudden increase of a spring constant.

In accordance with the present invention, more preferably, ribs are formed between the stopper and the one end portion of the flexible main body at a predetermined phase interval. That is, it is possible to secure a desired spring constant at a time of the stopper contact due to the ribs.

BEST MODE FOR CARRYING OUT THE INVENTION

Figure 1:
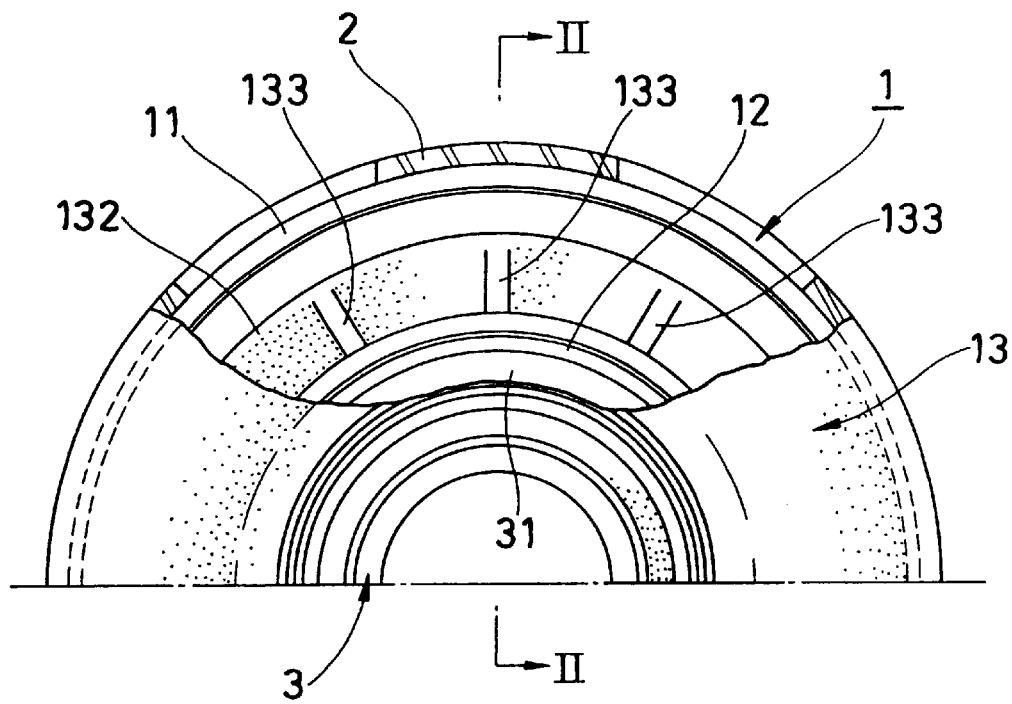
FIG. 1 is a partial front view showing a preferable embodiment of a center bearing support in accordance with the present invention in a partly broken manner.
Figure 2:
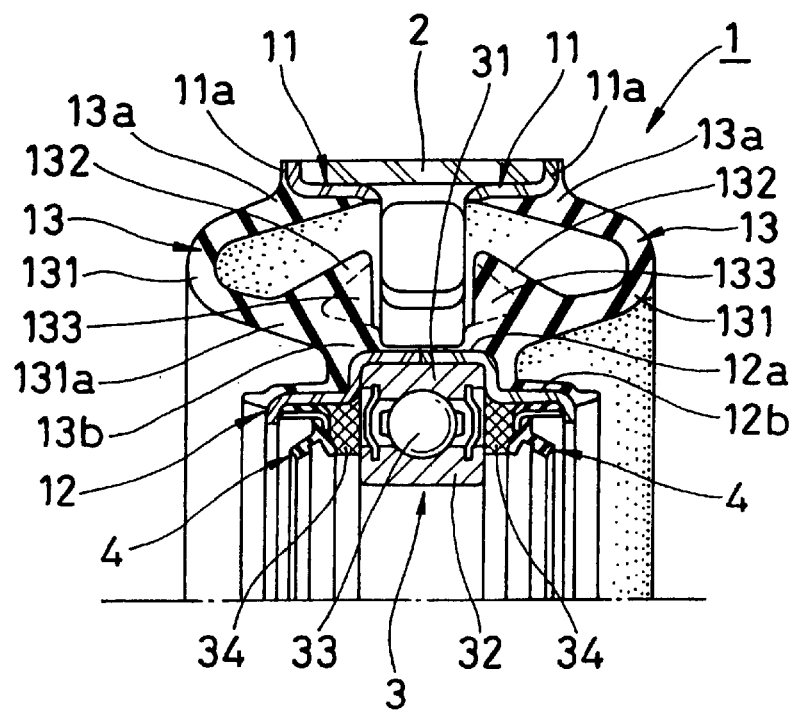
FIG. 2 is a cross sectional view along a line II—II in FIG. 1.

FIG. 1 is a partial front view showing a preferable embodiment of a center bearing support in accordance with the present invention in a partly broken manner, and FIG. 2 is a cross sectional view along a line II—II in FIG. 1.

That is, this center bearing support 1 is constituted of a pair of outer rings 11 and 11 pressure inserted and fitly attached to the inner peripheral surface of an annular bracket 2 fixed to the side of a vehicle body via a mount (not shown) or the like from both sides in the axial direction thereof, a pair of inner rings 12 and 12 arranged in the inner peripheries of the outer rings 11 and 11, and holding a center bearing 3 rotatably supporting a propeller shaft (not shown) and oil seals 4 and 4 arranged in both sides in the axial direction thereof, and an elastic body 13 elastically connecting between each of the outer rings 11 and each of the inner rings 12.

The outer rings 11 and 11 are made of a metal, for example, SPCC or SPHC or the like in accordance with Japanese Industrial Standards, and are formed in a symmetrical shape with each other with respect to a flat surface orthogonal to the axis, and flange portions 11a brought into contact with both end edges in the axial direction of the bracket 2 are formed in end portions facing to the opposite sides each other.

The inner rings 12 and 12 are made of a metal, for example, SPCC or SPCE or the like in accordance with Japanese Industrial Standards, and are formed in a symmetrical shape with each other with respect to a flat surface orthogonal to the axis, and bearing mounting portions 12*a* having an outer race 31 of the center bearing 3 pressure inserted and fitly attached are formed in end portions opposing to each other in the axial direction, and oil seal mounting portions 12*b* having a diameter smaller than the bearing mounting portion 12*a* and having the oil seals 4 pressure inserted and fitly attached to the inner peripheries thereof are formed in end portions in the opposite side, respectively.

The elastic bodies 13 and 13 are vulcanized and molded with an elastomer material, flexible main bodies 131 thereof are formed in a fold-back shape, the cross section of which is convex outward in the axial direction in the middle in the diametrical direction, and symmetrically with each other, outer peripheral end portions 13*a* are integrally vulcanized and bonded to the inner peripheral surfaces of the outer rings 11 respectively, and inner peripheral base portions 13*b* are vulcanized and bonded to the outer peripheral surfaces of the inner rings 12 respectively.

Figure 3:
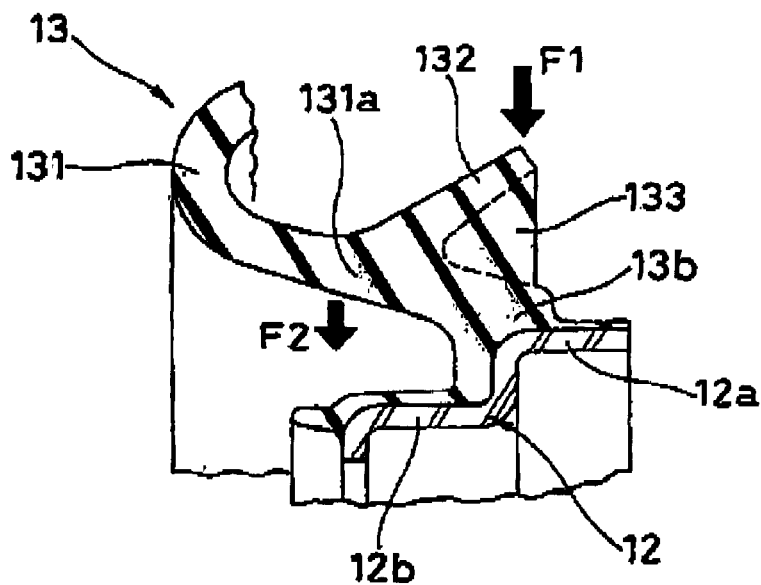
FIG. 3 is an enlarged cross sectional view of a main portion of the center bearing support in accordance with the present invention.

A stopper 132 extending from an inner peripheral end portion 131*a* of the flexible main body 131 to the outer peripheral side and the inner side in the axial direction so as to form a taper shape is formed in the flexible main body 131 extending from the inner peripheral base portion 13*b* in each of the elastic bodies 13, also as shown by an enlarged view in FIG. 3, and a front end portion thereof opposes to the inner surface of the outer peripheral end portion 13*a* in the elastic body 13 (the flexible main body 131) in the diametrical direction with a predetermined distance (for example, about 5.5 mm). Further, a lot of ribs 133 extending in the radial direction are formed between the stopper 132 and the inner peripheral end portion 131*a* of the flexible main body 131 at a predetermined phase interval (for example, at an interval of 30 degrees).

As the center bearing 3, basically a ball bearing having a known structure constituted of an outer race 31 and an inner race 32 concentrically arranged with each other, and a lot of steel balls 33 rotatably held between them with a uniform interval in a circumferential direction are used, and the outer race 31 is pressure inserted and fitly attached to the bearing mounting portions 12*a* and 12*a* of the inner rings 12 and 12, and the inner peripheral surface of the inner race 32 is fitly attached to the outer peripheral surface of the propeller shaft.

Further, the steel ball 33 is lubricated with a grease 34. The grease 34 is injected to the oil seal mounting portion 12*b* of each of the inner rings 12, and is sealed by the oil seal 4, the inner peripheral end of which contacts closely to the outer peripheral surface of the propeller shaft.

In accordance with the structure mentioned above, for example, in the case that a vibration is generated in the propeller shaft at a normal traveling of the motor vehicle, only the flexible main bodies 131 and 131 of the elastic bodies 13 and 13 are exposed to the bending deformation in correspondence to a repeated relative eccentric motion between the inner ring 12 in the side of the propeller shaft and the outer ring 11 in the side of the vehicle body due to a vibration input. Accordingly, a spring constant is small, and a vibration transmission to the side of the vehicle body can be effectively isolated.

Further, when a displacement due to the input vibration reaches a predetermined displacement amount, the outer peripheral end portion 13*a* of the elastic body 13 vulcanized and bonded to the inner peripheral surface of each of the outer rings 11 and the front end portion of the stopper 132 are in contact with each other. Accordingly, since in addition to the bending deformation of the flexible main body 131 of the elastic body 13, the stopper 132 is exposed to the bending deformation in a direction shown by an arrow F1 in FIG. 3, and the rib 133 in the inner periphery is exposed to the compression deformation, the spring constant increases from a contact starting point of the stopper 132 as shown by a solid line in the characteristic graph in FIG. 4, however, a rate of increase thereof is restricted to be low. This is because the compression spring constant of the elastomer material shows a non-linear increase with respect to a displacement, whereby the spring constant thereof is small at an early period of the compression deformation of the rib 133, and further, a part of the deforming force F1 applied to the stopper 132 and the rib 133 is absorbed by the inner peripheral end portion 131*a* of the flexible main body 131 being displaced in a direction shown by an arrow F2 in FIG. 3.

Figure 4:
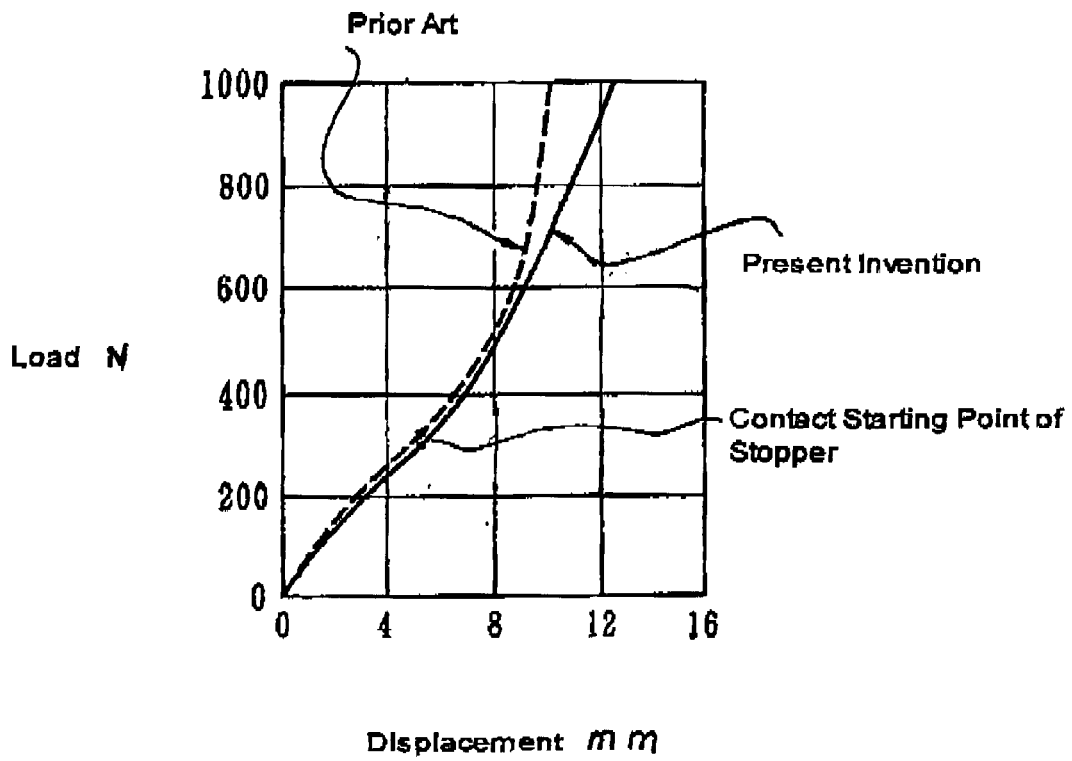
FIG. 4 is a characteristic graph showing a spring property of the center bearing support in accordance with the present invention by comparing with that of a conventional art.
Figure 5:
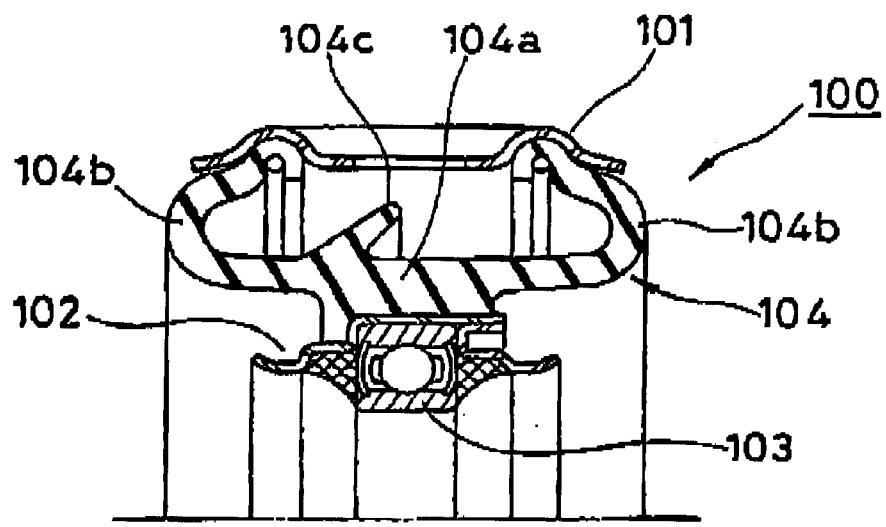
FIG. 5 is a half sectional view showing a center bearing support in accordance with the conventional art by cutting along a plane passing through an axis.
Figure 6:
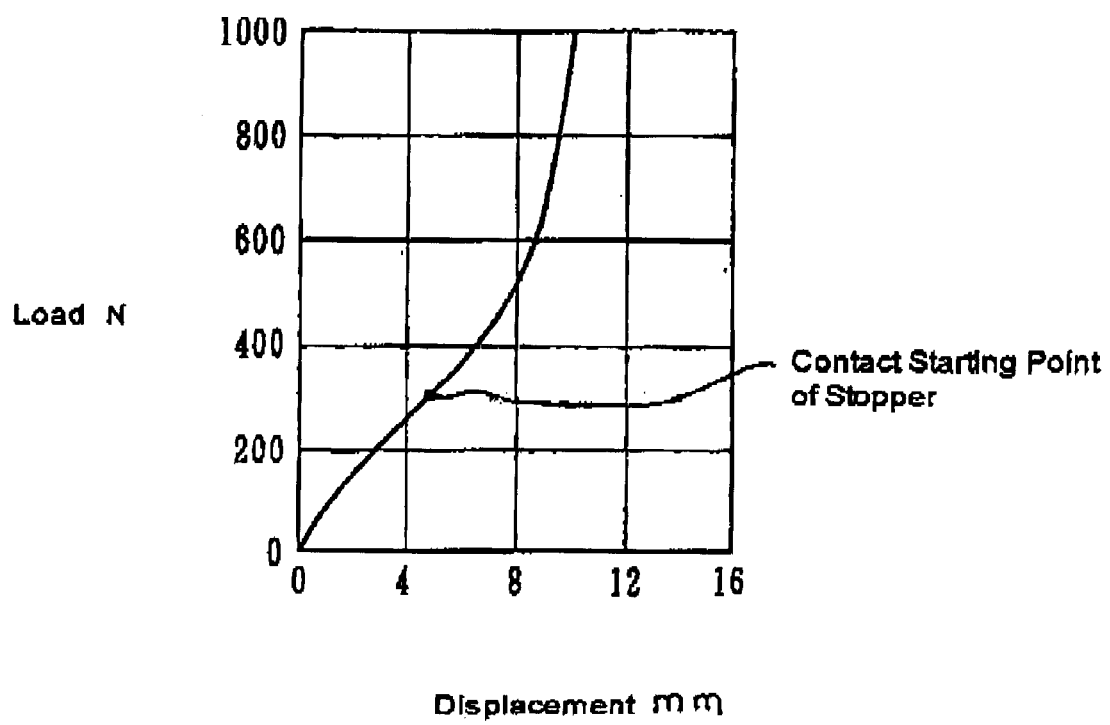
FIG. 6 is a characteristic graph showing a spring property in accordance with the conventional art.

Further, in the conventional structure previously described and shown in FIG. 5, when the relative displacement amount between the outer ring 101 and the inner ring 102 further increases after the stopper 104*c* has been in contact with the outer ring 101, the fallen down stopper 104*c* is exposed to the compression between the base portion 104*a* and the outer ring 101, whereby the spring constant suddenly increases as shown by a broken line in FIG. 4. On the other hand, in accordance with the structure of the present invention, since a part of the deforming force F1 in the diametrical direction applied to the stopper 132 and the rib 133 is absorbed by the inner peripheral end portion 131*a* of the flexible main body 131 being displaced in the direction of F2 as mentioned above, the rate of increase of the spring constant becomes gentle in comparison with the conventional one, and can achieve an excellent shock-absorbing property.

Further, for example, in the case of forming the stopper 132 near a curved middle portion of the flexible main body 131, there is a risk that a normal bending deformation motion of the flexible main body 131 is prevented by the stopper 132 being held in, however, in the case of employing the structure in which the stopper 132 extends from a portion between the base portion in each of the elastic bodies 13 and the middle portion of the flexible main body 131, preferably extends from the end portion of the flexible main body 131, as in the present invention, the risk mentioned above is removed. Accordingly, it is possible to secure the normal bending deformation motion of the flexible main body 131 and it is possible to obtain an excellent shock-absorbing property applied by the stopper 132.

In manufacturing the center bearing support 1 having the structure mentioned above, it is possible to obtain a mold product in which the elastic body 13 is integrally vulcanized and bonded in the outer ring 11 and the inner ring 12 by concentrically arranging the outer ring 11 and the inner ring 12 with each other within metal molds separated in the axial direction and charging a molding material into a forming space defined between the outer ring 11 and the inner ring 12 to vulcanize and mold. Next, it is possible to assemble in a state shown in FIGS. 1 and 2 by respectively pressure inserting and fitly attaching the oil seals 4 to the oil seal mounting portions 12*b* in the inner ring 12, thereafter pressure inserting and fitly attaching the respective outer rings 11 in the molded product to the bracket 2 from both sides in the axial direction, and pressure inserting and fitly attaching the bearing mounting portions 12*a* of the respective inner rings 12 to the outer races 31 of the center bearing 3.

In this case, for example, as shown in FIG. 5 which is previously described, since in the conventional structure in which the elastic body 104 having a pair of flexible main bodies 104b and 104b is integrally vulcanized and molded vulcanized and bonded in the outer periphery of the inner ring 102, a mold releasing direction after molding the elastic body 104 is the diametrical direction, it is impossible to form the elastic body 104 in a shape in which the flexible main body 104b and the stopper 104c overlap with each other in the diametrical direction. On the contrary, in accordance with the center bearing support 1 of the aspect shown in FIGS. 1 and 2, a mold releasing direction of the metal mold after forming the elastic body 13 is the axial direction, so that a difficulty in mold release is not generated even in the case that the outer peripheral portion of the flexible main body 131, the stopper 132 and the rib 133 in the elastic body 13 overlap in the diametrical direction as shown in FIG. 2.

Further, therefore the size in the axial direction of the flexible main body 131 does not become so large as in the case of forming the elastic body 13 in the shape in which the outer peripheral portion of the flexible main body 131 and the stopper 132 do not overlap in the diametrical direction.

Further, since the center bearing support 1 supports the propeller shaft near the middle joint portion thereof, in the case that the propeller shaft oscillates around the end portion of the front side thereof, the vibration in a pinching direction is input to the center bearing support 1, and amounts of displacement applied to the elastic bodies 13 and 13 are different from each other. In accordance with the structure of the present invention, since the elastic bodies 13 and 13 are independent from each other, it is possible to execute modification such as giving different spring constants to both of the elastic bodies 13 and 13, making the contact starting points of both of the stoppers 132 and 132 different from each other, or the like by changing the bending shape or the thickness of the flexible main body 131 or the elastomer material for example, so as to correspond to the pinch vibration mentioned above.

In this case, the present invention is not limited to the illustrated aspect, and the present invention can be executed by forming the stopper 132 and the rib 133 in the same manner as FIGS. 1 and 2, for example, with respect to the center bearing support in which the single elastic body 13 is provided. Further, the same effect can be expected even by forming the stopper 132 and the rib 133 in the inner periphery of the outer peripheral end portion of the flexible main body 131, whereby the stopper 132 is in contact with the inner peripheral end portion of the elastic body 13 at a time when an excessive displacement is input.

INDUSTRIAL APPLICABILITY

As described above, in accordance with the center bearing support of the present invention, by elastically supporting the center bearing mounted to the propeller shaft of the motor vehicle in the side of the vehicle body, the vibration of the propeller shaft during the travel is restricted, and the vibration transmission between the side of the propeller shaft and the side of the vehicle body is reduced, and by providing the rib in the stopper, the desired spring constant against the excessive displacement input is secured, and by forming the stopper in the end portion of the flexible main body in the elastic body, whereby a part of the deforming force applied to the stopper and the rib is absorbed by the displacement of the end portion of the flexible main body, the spring constant does not suddenly increase at a time when the stopper operates, and it is possible to achieve an excellent shock-absorbing property.

What is claimed is:

1. A center bearing support comprising an inner ring provided in an inner periphery of an outer ring for fixing to the side of a vehicle body via an elastic body made of an elastomer material, a center bearing for rotatably supporting a supported shaft being mounted to an inner periphery of the inner ring, a stopper being formed in an end portion of a flexible main body extending from one of an inner peripheral base portion and an outer peripheral end portion of said elastic body bonded to one of said inner ring and the outer ring, the stopper being capable of being bending deformed due to a contact with a side of another end portion, and ribs formed between the stopper and one end portion of the flexible main body at a predetermined phase interval.

* * * * *